(12) United States Patent
Barnes (10) Patent No.: US 11,327,903 B2
(45) Date of Patent: May 10, 2022

(54) MULTIPLE GUARD TAG SETTING INSTRUCTION

(71) Applicant: ARM LIMITED, Cambridge (GB)

(72) Inventor: Graeme Peter Barnes, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/647,729

(22) PCT Filed: Dec. 10, 2018

(86) PCT No.: PCT/GB2018/053577
§ 371 (c)(1),
(2) Date: Mar. 16, 2020

(87) PCT Pub. No.: WO2019/141960
PCT Pub. Date: Jul. 25, 2019

(65) Prior Publication Data
US 2020/0233816 A1    Jul. 23, 2020

(30) Foreign Application Priority Data

Jan. 22, 2018   (GB) .................................... 1800970

(51) Int. Cl.
| | |
|---|---|
| *G06F 12/00* | (2006.01) |
| *G06F 12/14* | (2006.01) |
| *G06F 9/30* | (2018.01) |

(52) U.S. Cl.
CPC ...... *G06F 12/1425* (2013.01); *G06F 9/30145* (2013.01); *G06F 2212/1052* (2013.01)

(58) Field of Classification Search
CPC ............ G06F 12/1425; G06F 9/30145; G06F 2212/1052; G06F 11/0772; G06F 11/073;
(Continued)

(56) References Cited

U.S. PATENT DOCUMENTS

| | | | | |
|---|---|---|---|---|
| 4,903,196 A | * | 2/1990 | Pomerene | G06F 9/3836 712/215 |
| 5,452,427 A | * | 9/1995 | Tobita | G06F 9/30149 712/210 |

(Continued)

OTHER PUBLICATIONS

Robert Bedichek, "Some Efficient Architecture Simulation Techniques", Proceedings of the Winter 1990 USENIX Conference, Jan. 22-26, 1990, 12 pages.

(Continued)

*Primary Examiner* — Reginald G Bragdon
*Assistant Examiner* — Sakhr A Aldaylam
(74) *Attorney, Agent, or Firm* — Nixon & Vanderhye P.C.

(57) ABSTRACT

An apparatus has memory access circuitry to perform a tag-guarded memory access operation in response to a target address. The tag-guarded memory access operation comprises: comparing an address tag associated with the target address with a guard tag stored in a memory system in association with a block of one or more memory locations comprising an addressed location identified by the target address, and generating an indication of whether a match is detected between the guard tag and the address tag. An instruction decoder decodes a multiple guard tag setting instruction to control the memory access circuitry to trigger memory accesses to update the guard tags associated with at least two consecutive blocks of one or more memory locations.

17 Claims, 8 Drawing Sheets

(58) Field of Classification Search
CPC .. G06F 11/141; G06F 9/45504; G06F 9/3004; G06F 12/14; G06F 11/00
See application file for complete search history.

(56) References Cited

U.S. PATENT DOCUMENTS

| | | | | |
|---|---|---|---|---|
| 5,761,464 | A * | 6/1998 | Hopkins | G06F 13/4018 |
| | | | | 710/306 |
| 6,756,921 | B2 * | 6/2004 | Kimura | H03M 7/40 |
| | | | | 341/107 |
| 7,502,890 | B2 * | 3/2009 | Kailas | G06F 12/126 |
| | | | | 711/133 |
| 7,796,137 | B1 | 9/2010 | Mrazek et al. | |
| 2002/0124148 | A1 | 9/2002 | Beukema et al. | |
| 2007/0283115 | A1 * | 12/2007 | Freeman | G06F 21/6227 |
| | | | | 711/163 |
| 2013/0080698 | A1 * | 3/2013 | Raghunathan | G06F 3/061 |
| | | | | 711/114 |
| 2017/0083255 | A1 | 3/2017 | Chiricescu et al. | |
| 2017/0371793 | A1 | 12/2017 | Saidi et al. | |
| 2018/0004525 | A1 * | 1/2018 | Baghsorkhi | G06F 9/30047 |

OTHER PUBLICATIONS

Richard H. Gumpertz, "Error Detection with Memory Tags", Computer Science Department, Carnegie-Mellon University, Dec. 1981, 119 pages.
Combined Search and Examination Report for GB Application No. 1800970.4 dated Jul. 27, 2018, 7 pages.
International Search Report and Written Opinion of the ISA for PCT/GB2018/053577 dated Mar. 20, 2019, 12 pages.
U.S. Appl. No. 17/370,291, filed Jul. 8, 2021, Grisenthwaite et al.
Arm Limited, Extract of "Arm® Architecture Reference Manual—Armv8, for Armv8-A architecture profile" Jul. 17, 2020, 13 pages.
Arm, "Armv8.5-A Memory Tagging Extension" White Paper, 2019, 9 pages.
Office Action for IL Application No. 275309 dated Dec. 20, 2021, 3 pages.

* cited by examiner

MULTIPLE GUARD TAG SETTING INSTRUCTION

This application is the U.S. national phase of International Application No. PCT/GB2018/053577 filed Dec. 10, 2018 which designated the U.S. and claims priority to GB Application No. 1800970.4 filed Jan. 22, 2018, the entire contents of each of which are hereby incorporated by reference.

The present technique relates to the field of data processing.

Software to be executed by a data processing apparatus may typically be written in a high-level programing language and then compiled into code according to the instruction set architecture supported by the apparatus on which the software is to be executed. For example, the software may originally be written in a higher level language such as Java, C or C++, and then compiled into a natively supported instruction set architecture such as x86 or Arm®.

Some higher level programing languages, such as Java, are considered memory-safe languages because they include run time error detection checks for checking for certain errors relating to memory accesses. In contrast, memory-unsafe languages, such as C and C++, do not include such run time error checks. The enduring prevalence of use of memory-unsafe languages means that in compiled code according to a given instruction set architecture, there may be a large number of memory related errors which may be vulnerable to exploitation by an attacker or other malicious party. Such errors may include:

Bounds violations, in which an array index supplied by the code is outside the legitimate bounds of the array;
Use-after-free errors, in which an access to a memory location is made after that memory location has already be deallocated or freed;
Use-after-return, in which a memory access to an address associated with a variable used within a function (such as a value on a stack) is made after already returning from the function;
Use-out-of-scope errors, in which variables are accessed outside of the scope in which they are declared; and
Use-before-initialisation errors, in which a memory address associated with a variable is accessed before the variable has been initialised.

These are just some examples of memory-related errors which can result in unpredictable behaviour and potentially provide avenues for attackers to exploit. Hence, it may be desirable to provide architectural support, within the instruction set architecture supported by a given processing apparatus, for assisting with runtime detection of certain classes of memory errors.

At least some examples provide an apparatus comprising:
memory access circuitry to perform a tag-guarded memory access operation in response to a target address, the tag-guarded memory access operation comprising:
comparing an address tag associated with the target address with a guard tag stored in a memory system in association with a block of one or more memory locations comprising an addressed location identified by the target address; and
generating an indication of whether a match is detected between the guard tag and the address tag; and
an instruction decoder to decode a multiple guard tag setting instruction to control the memory access circuitry to trigger at least one memory access to update the guard tags associated with at least two consecutive blocks of one or more memory locations.

At least some examples provide a method comprising:
performing a tag-guarded memory access operation in response to a target address, the tag-guarded memory access operation comprising:
comparing an address tag associated with the target address with a guard tag stored in a memory system in association with a block of one or more memory locations comprising an addressed location identified by the target address; and
generating an indication of whether a match is detected between the guard tag and the address tag; and
in response to decoding of a multiple guard tag setting instruction, triggering at least one memory access to update the guard tags associated with at least two consecutive blocks of one or more memory locations.

At least some examples provide a computer program for controlling a host data processing apparatus to provide an instruction execution environment for execution of instructions of target program code, comprising:
memory access program logic to perform a tag-guarded memory access operation in response to a target address, the tag-guarded memory access operation comprising:
comparing an address tag associated with the target address with a guard tag stored in a memory system in association with a block of one or more memory locations comprising an addressed location identified by the target address; and
generating an indication of whether a match is detected between the guard tag and the address tag; and
tag setting program logic responsive to a multiple guard tag setting instruction of the target program code to trigger at least one memory access to update the guard tags associated with at least two consecutive blocks of one or more memory locations.

A storage medium may store the computer program described above. The storage medium may be a non-transitory storage medium.

Further aspects, features and advantages of the present technique will be apparent from the following description of examples, which is to be read in conjunction with the accompanying drawings, in which.

One approach for protecting against certain memory usage errors of the type discussed above may be to provide guard tags which are stored in a memory system in association with blocks of one or more memory locations. When a tag-guarded memory access operation is requested based on a target address identifying a particular addressed location in the memory system, memory access circuitry may compare an address tag that is associated with the target address with a guard tag that is stored in the memory system in associated with a block of one or more memory locations which includes the addressed location identified by the target address. The memory access circuitry may generate an indication of whether a match is detected between the guard tag and the address tag. This indication can be used to control whether the memory access is allowed to succeed or whether subsequent operations can succeed, or could merely be reported while allowing memory accesses to continue as normal.

This can be useful as, for example, a compiler compiling code based on a memory-unsafe language such as C or C++ can, when initialising regions of memory, set the guard tags of blocks of memory which the code is expected to access to particular values, and may associate the corresponding address tag values with the target addresses pointing to those blocks. If a memory usage error occurs, and for example the address pointer is used out of scope or extends out of the bounds of the valid range which was initialised, then it may be likely that the guard tag associated with the addressed location may not match the address tag associated with the target address, and then in this case the indication of whether a match is detected can be used to trigger some error handling response or error reporting mechanism. The particular response taken can depend on the particular needs of the software being executed or on the particular microarchitectural implementation of the architecture. Hence, even if the high level language does not have means for performing run time error checks in order to guard against memory access errors, the ISA used for the compiled code may include architectural features for performing such checks.

However, use of such guard tags may incur some overhead in setting the guard tags that are associated with particular blocks of memory. The process for setting the guard tags associated with blocks of memory locations may need to be relatively fast as any delay associated with setting the guard tags may also delay subsequent processing of the real software functionality being performed. The apparatus discussed below has an instruction decoder to decode a multiple guard tag setting instruction to control the memory access control circuitry to trigger at least one memory access to update the guard tags associated with at least two consecutive blocks of one or more memory locations. It may be relatively common for the guard tags associated with a range of consecutive blocks of memory locations to be set to the same tag value, e.g. on initialising regions of memory. By providing a multiple guard tag setting instruction which can, in response to a single instruction, trigger one or more memory accesses required to update the guard tags associated with an entire range of memory blocks, this can speed up setting of the tags and hence improve performance. Also, this instruction helps to reduce code density since a tighter loop with fewer instructions can control the setting of the tags for a given region of memory, requiring less space for storing instructions in memory and in any caches.

The particular form of the generated indication of whether a match is detected between the guard tag and the address tag may vary from implementation to implementation. In some cases, the tag-guarded memory access operation may comprise controlling whether a memory access to the addressed location is allowed depending on whether the match is detected between the guard tag and the address tag. However, in other examples the tag-guarded memory access may comprise performing a memory access to the addressed location irrespective of whether a match is detected between the guard tag and the address tag. For example, the guard tag associated with a given block of memory locations may be stored in a different block of memory locations within the memory system and so accessing the guard tag may require a separate read operation. Therefore, it may delay processing of the actual memory access if the memory access is delayed until the guard tag and the address tag have been compared, so it may be desired to perform the memory access to the addressed location before the guard tag is available, and regardless of whether any match is detected between the guard tag and the address tag, and then to generate a separate indication of whether a match is detected once the guard tag has been obtained and compared with the address tag.

In one example the indication of whether a match is detected may be a signal representing a fault condition, which is generated when a mismatch is detected between the guard tag and the address tag. For example, the memory access circuitry may signal a similar memory fault to faults generated if access permissions are violated or unmapped addresses are accessed, or a different kind of fault condition could be indicated. The fault signal could trigger the processing circuitry to execute an exception handling routine for responding to the detected fault.

Alternatively, status indication may be recorded within a control register accessible to the processing circuitry of the apparatus, to indicate whether a match or mismatch was detected in the comparison of the guard tag and the address tag. The status information could then be read by subsequent instructions to check whether the memory access was valid.

Another option for reporting whether the address tag and guard tag matched or mismatched can be to record information in an error log associated with the executed piece of code, which tracks any guard tag errors detected throughout the piece of code. For example, in response to a mismatching guard tag and address tag, the target address which triggered the mismatch, or the instruction address of the instruction which triggered the mismatching memory access, could be recorded in the error log. In this case, rather than performing any specific action to impede the operation of the code, the errors could simply be recorded in the error log. The error log could then be made available to a software provider of the code to assist the provider with eliminating errors in subsequent versions of the software.

Hence, it will be appreciated that there are a range of ways in which the guard tag match/mismatch indication could be generated by the memory access circuitry.

In some embodiments, the blocks of memory locations which have corresponding guard tags may each comprise a single memory location. In this case, each individual memory location may have a different guard tag, which can provide fine granularity of setting the guard tags so that a greater range of memory errors can be detected.

However, in practise the overhead of setting individual guard tags for each addressed location may be too high, and it can be more efficient to associate each guard tag with a block of multiple memory locations. In this case several adjacent memory locations may share the same guard tag, which can be enough for detecting common forms of memory-related error.

The guard tag which is associated with a given block of memory locations can be stored at any other memory location within the memory system. The particular way in which the location of the guard tags in the memory system is selected may vary significantly from implementation to implementation or at run time. In some examples, the location storing the guard tags could be architecturally accessible by the processing circuitry, i.e. the guard tag storage location may be a location mapped to part of the same address space as the addressed location. In this case, the mapping between the addressed location itself and the address of the corresponding tag storage location could be fixed or hardwired, or could be variable, e.g. tracked in a tracking table maintained by the memory access circuitry or in a translation lookaside buffer. Alternatively, other implementations may store the guard tag associated with a given addressed location in a further storage location which is not architecturally accessible to the processing circuitry, e.g. in additional storage provided in the micro-architecture which is not mapped to the address space which can be addressed by instructions executed by the processing circuitry. In this case, the memory access circuitry may determine, based on the address of the addressed location, the particular internal address used to refer to the corresponding tag storage location, and trigger any additional memory access needed to read the tag data from the tag storage location. Regardless of whether or not the tag storage location is architecturally accessible to the processing circuitry, tag values could also be cached within a cache for faster access, either within the same cache used for data values, or in a dedicated tag cache.

In some cases, the guard tags may be relatively small, for example 4 or 8 bits, and so multiple guard tags each associated with a different block of memory locations may fit within the same memory location. Hence, while multiple guard tags may be updated in response to the multiple guard tag setting instruction, in some cases the multiple guard tags may be updated in a single memory access if they are all stored within a single location which can be written to by a single write operation by the memory access circuitry. Alternatively, other implementations may need to trigger multiple independent writes to set different subsets of the guard tags to be set in response to the multiple guard tag setting instruction. Therefore, it is possible that the instruction could trigger either a single memory access or multiple memory accesses for setting the guard tags.

The address tag can be associated with the target address in different ways. In some cases the address tag could be specified separately from the target address, e.g. using a separate register specified by the tag-guarded memory access instruction which triggers the tag-guarded memory access operation. However, in other examples the address tag may be determined as a function of one or more selected bits of the target address. That is, the address tag may comprise information derived from a portion of the target address itself. Often, while an instruction set architecture may support addresses with a certain number of bits (e.g. 64 bits), a given hardware device may not in practice need so much memory capacity that it would use all the possible addresses which can be represented using that number of bits. For example, with current trends in device usage there is not yet any need to provide $2^{64}$ individual addressable locations. Therefore, often some bits of the memory addresses may effectively be unused and may either always have the same value, or be set as a sign extension of the most significant "real" address bit (so that the unused portion is set to all 0s or all 1s). This unused portion can therefore be reused to represent the address tag or a value for deriving the address tag, to avoid needing to access a separate register in order to obtain the address tag, and also to make it easier to track the correspondence between the addresses and the corresponding address tags as the address tag may by definition be transported along with the address whenever the address is manipulated or moves between registers.

In embodiments which use a portion of the target address to determine the address tag, note that this address tag is different to a tag portion of the target address which may be used by caches to determine whether the information from the addressed location identified by the target address is stored within the cache. Many caching schemes may store a tag portion of the address of a cached piece of data alongside that data within the cache, so that on searching the cache for a given address, part of the address can be compared with the tags stored alongside the cached data in order to determine whether the cached data actually corresponds to the required address. However, in this case the tag portion of the address, which is compared with the tag in the cache would be part of the portion of the address which actually identifies the particular addressed location for which the data is required, i.e. changing the cache tag portion of an address would by definition result in the address pointing to a different addressed location within the memory system. In contrast, with the address tag used for the tag-guarded memory operation, the memory access circuitry may select the addressed location for which data is required independent of the address tag. That is, even if the address tag has different values, the addressed location referenced by the target address may still be the same as the selection of the addressed location depends only on other portions of the target address. This gives the freedom for compilers to set the address tags associated with particular addresses to any value to match the corresponding guard tag values which have been allocated to the relevant blocks of data in the memory system. Also, with cache tagging the storage of tag values into the cache may be controlled by a cache controller and need not be explicitly instructed by a tag setting instruction decoded by the instruction decoder, and typically in response to a memory access to a given addressed location only a single cache tag would need to be set to a new value (the cache tag associated with the cache entry used to cache the data associated with the given addressed location). In contrast, with the multiple guard tag setting instruction the instruction decoder supports a specific instruction for instructing the setting of multiple guard tags associated with different addressed locations in memory.

In some implementations, the instruction decoder could support separate non-tag-guarded and tag-guarded variants of memory access instructions. In this case, the tag-guarded memory access operation could be triggered in response to the tag-guarded variant of the memory access instruction. In contrast non-tag-guarded memory access instructions could simply trigger an access to the addressed location identified by the target address specified by that instruction, without needing to obtain a guard tag or perform any comparison between the address tag and the guard tag.

However, in other implementations all memory accesses may be considered to be tag-guarded memory accesses. Hence, in some cases any memory access instruction may be considered to trigger the memory access circuitry to perform a tag-guarded memory access operation as discussed above.

However, even if all memory access instructions are interpreted as tag-guarded memory access instructions, there may still be other ways in which the instruction set architecture may support selectively disabling the guard tag comparison for certain operations. For example, a control parameter within a control register of the processing apparatus could selectively disable tag comparisons. Another option is for a certain value of the address tag to be interpreted in a special manner so that they indicate that the address tag should be considered to match against any possible value of the guard tag, again effectively disabling the effects of the tag comparison so that no error is reported regardless of whether the address tag matches the guard tag.

The multiple guard tag setting instruction can be implemented in different ways. One particular useful variant is to provide a register-length-specifying variant of the multiple guard tag setting instruction which identifies a length register. In response to this variant the instruction decoder may control the memory access circuitry to update the guard tags associated with a given number of consecutive blocks less than or equal to a maximum number of blocks identified by a length parameter stored in the length register, and control processing circuitry to decrement the length parameter stored in the length register by an amount proportional to the given number. Hence, rather than specifying an absolute number of blocks for which the guard tags are to be updated, the length register specifies a maximum number of blocks for which the corresponding guard tags are allowed to be updated in response to the instruction. The particular number selected as the given number of consecutive blocks (for which the guard tags are to be updated) may be selected on an implementation-by-implementation basis or could vary at run time. This can be useful to provide flexibility in micro architectural design while still enabling the same sequence of instructions to be executed with the expected architectural behaviour across a range of micro architectures. Hence, an implementation-agnostic software routine can be executed using the register-length-specifying variant of the instruction, allowing the implementation to decide the particular granularity of tag setting.

This form of the multiple guard tag setting instruction can be extremely useful because it may be undesirable to commit the memory access circuitry to performing all the update operations for a large region of memory in response to a single instruction. For example, if memory accesses for updating a large number of different guard tags are committed, then this may block resources for handling other operations and may make it harder to reorder memory access operations to improve efficiency. Therefore some micro architecture designers may prefer to constrain how many guard tags can be updated by one instruction. The number of guard tag updates allowed in response to one instruction may vary from implementation to implementation. For example different implementations may implement different cache line sizes in the memory system. An implementation with a larger cache line size may be able to set a greater number of guard tags in response to one instruction than an implementation using a smaller cache line size. Also, even within a particular micro architectural implementation, sometimes the number of guard tags which can efficiently be set in response to one instruction may depend on the relative position of the target address within a cache line. For example it can be more efficient to perform memory accesses aligned to a cache line boundary, and so if the tag values to be updated start part way through a cache line, then it may be more efficient to only update the guard tags which would extend up to the end of a cache line rather than continuing onto the next cache line, so that a subsequent instance of the multiple guard tag setting instruction may then start from an aligned address making the memory accesses more efficient.

Therefore, for a number of reasons, it may be useful to give the memory access circuitry the flexibility to vary how many blocks of memory locations have their guard tags updated in response to the multiple guard tag setting instruction. The maximum number of blocks specified by the length parameter in the length register constrains the update so that the guard tags are not updated beyond the end of the range for which the guard tags need to be set. Since the instruction triggers the processing circuitry to decrement the length parameter based on the given number of blocks for which the guard tags were updated, this means that a loop of instructions including the multiple guard tag setting instruction can be defined to initially specify the required number of blocks for which the guard tag are to be updated in the length register and then the loop can iterate through multiple instances of the multiple guard tag setting instruction, each iteration decrementing the length parameter by an amount proportional to the number of blocks for which the tags have been updated, until the loop may be exited once the length parameter has been decremented to zero, at which point the required number of tags will have been set. This enables exactly the same loop to execute on a range of different micro architectures regardless of how many blocks are actually given updated as a guard tag value in response to a single instance instruction.

In some examples, the length parameter could specify the exact number of blocks for which the tags are to be updated. In this case, the amount by which the length parameter is decremented may be equal to the given number itself.

Alternatively, in some implementations the amount by which the length parameter is decremented could be greater or less than the number of blocks for which the guard tags are updated, but proportional to the number of blocks for which the guard tags are updated.

For example, for some implementations the length parameter could be specified as a number of bytes of memory for which the guard tags are to be set. The micro-architecture could select a particular number of bytes less than or equal to the maximum defined in the length parameter, and set the guard tags for the selected number of bytes of memory. As each guard tag may correspond to multiple bytes of memory, this may mean that the amount by which the length parameter is decremented may be proportional to, but greater than, the number of tags that are updated in response to the instruction.

In other examples, the length parameter could define the length parameter in terms of a multiple of some base granularity of blocks. In this case, the length parameter could specify how many multiples of blocks are to be updated, so that the amount by which the length parameter is decremented may be proportional to, but less than, the number of guard tags that are actually updated. For example, for some micro-architectures, it could be more efficient to update guard tags at the granularity of the number of guard tags which fit in one guard memory location, or the number of guard tags which are associated with one data memory location. In this case, to reduce the number of bits needed for the length parameter, the length parameter could actually specify the number of data/guard memory locations for which the corresponding tags are to be updated, not the absolute number of guard tags. The tag setting instruction could therefore trigger the length parameter to be decremented by an amount corresponding to the number of updated guard tags divided by the number of guard tags corresponding to the base granularity at which guard tags are allowed to be updated.

Nevertheless, while the register-length-specifying variant may provide an extremely flexible architecture supporting different micro architectures, in other examples an immediate-length-specifying variant of the multiple guard tag setting instruction could be provided, in which an immediate parameter specified in the encoding of the instruction identifies how many blocks of the memory system are to be given updated guard tag values. In response to the immediate-length-specifying variant, the instruction decoder may control the memory access circuitry to update the guard tags associated with the number of consecutive blocks specified by the immediate parameter. Hence, in this case the micro architecture may have no choice in how many blocks are to have their guard blocks updated, but may simply update the number of guard tags indicated by the immediate parameter.

It would also be possible to provide a register-based variant which specifies a length register indicating the absolute number of blocks for which the guard tags are to be updated, which may behave in a similar way to the immediate-length-specifying variant, so the length parameter in the register may specify the exact number of blocks for which the tags are to be updated, rather than a maximum number of blocks as in the register-length-specifying variant discussed above.

The multiple guard tag setting instruction may specify a tag update target address which identifies the consecutive blocks of memory for which the guard tags are to be updated. In general, the at least two consecutive blocks targeted by the multiple guard tag setting instruction may comprise the memory location which is actually identified by the tag update target address and at least one subsequent block of memory locations which is consecutive to the memory location identified by the tag update target address. Note that the one or more memory accesses triggered by the multiple guard tag setting instruction are not writes to the tag update target address itself or to the subsequent blocks of memory locations following the memory location identified by the tag update target address. Instead, the one or more memory writes triggered by the multiple guard tag setting instruction may target the storage locations at which the guard tags which correspond to the consecutive blocks of memory identified by the tag update address are stored.

The multiple guard tag setting instruction may use an address register to define the tag update target address. The address register may store an address determining value for determining the tag update target address which identifies the at least two consecutive blocks for which the guard tags are to be updated. For example, the address register could specify an absolute address corresponding to the tag update target address, or could specify an offset which is to be added to a base address in order to obtain the tag update target address. The base address could be specified in a separate register or could be implicit, e.g. some variants of instructions may use program counter relative addressing and so the base address could comprise a program counter which indicates a current address reached during program execution.

In general, regardless of whether the register-length-specifying variant or immediate-length specifying variant discussed above is used, in response to the multiple guard tag setting instruction, the instruction decoder may control processing circuitry to increment or decrement the address determining value stored in the address register by an offset corresponding to the number of blocks in memory locations for which the guard tags are updated in response to the multiple guard tag setting instruction. This means that when the multiple guard tag setting instruction is provided within a loop then the address register is automatically updated to point to the next address after the last block of memory locations for which the guard tag was updated, so that there is no need to include an additional instruction for manipulating the address register. This helps improve code density and performance. The loop of instructions could traverse a given memory region from lowest address to highest address (incrementing the address in the address register by the offset each time) or from highest address to lowest address (decrementing the address by the offset each time).

The updated tag value used to update the guard tags may be derived from the multiple guard tag setting instruction in different ways. In some cases, the updated tag value could be represented using one or more selected bits of the tag update target address, in a similar way to the way in which the address tag for the tag-guarded memory access can be represented within a portion of the target address. Hence, in some examples, in response to the multiple guard tag setting instruction, the instruction decoder may control the memory access circuitry to trigger memory accesses to update the guard tags associated with at least two consecutive blocks to an updated tag value determined as a function of one or more selected bits of the tag update target address.

Alternatively, some forms of instruction may specify a tag value register for identifying the updated tag value, separate from any register used to identify the tag update target address. In this case in response to the multiple guard tag setting instruction, the instruction decoder may control the memory access circuitry to trigger memory accesses to update the guard tags associated with the at least two consecutive blocks to an updated tag value determined as a function of a value stored in a tag value register specified by the multiple guard tag setting instruction independent from the tag update target address.

Which of these two approaches is taken may be determined based on a trade off between the encoding overhead within the multiple guard tag setting instruction and the expected overhead in setting the updated tag values for a given instruction. The first approach of representing the updated guard tag within the update target address may avoid the need to provide a further register identifier within the instruction encoding, leaving more encoding space available for other purposes, which can be useful as encoding space is often at a premium within instruction set architectures. On the other hand, if the updated tag value is stored in a separate tag value register then this avoids the need for a separate instruction to write the desired updated tag value into a portion of the tag update target address before executing the multiple guard tag setting instruction, which could reduce code density. Both options can be used.

A data-clearing variant of the multiple guard tag setting instruction can also be provided. In response to this variant, the instruction decoder may control the memory access circuitry, in addition to setting the updated guard tags, to also trigger memory accesses for setting data values stored in the at least two consecutive blocks of one or more memory locations to a cleared value. The cleared value may be any value which is uncorrelated with a previous value of the data value. For example, cleared value could be a predetermined value, such as zero, or a randomly generated value. This can be useful since often the guard tag setting may be performed as part of a process for initialising blocks of memory and at the same time it may also be desired to clear the contents of the initialised block of memory to some predetermined value to avoid data previously stored in that region of the address space being visible to the subsequently executed code. By providing a data-clearing variant of the multiple guard tag setting instruction, this avoids a need to execute a second instruction for clearing the data, as the guard tag setting and data clearing can both be performed in response to a single instruction. Any of the types of multiple guard tag setting instruction described above could be provided with an additional data clearing variant as well, so that both non-data clearing and data-clearing variants of the same form of multiple guard tag setting instruction can be provided. Alternatively, in some implementations all the multiple guard tag setting instruction variants could by definition be data-clearing variants, so some implementations may not support any non-data-clearing variants of the multiple guards and tag setting instruction.

All of the variants of the multiple guard tag setting instruction described above may be instructions which, for at least some values of its parameters (either register-specified parameters or immediate parameters), may trigger the memory access circuitry to update the guard tags associated with at least two consecutive blocks of memory locations. However, the same types of instructions could, for other values of the parameters, trigger updating of only a single guard tag, or could in some instances trigger no updates to any guard tags at all. For example, if the length parameter specified in the length register of the register-length-specifying variant is zero then the instruction may not trigger any guard tags to be updated. Similarly if the length parameter specifies 1 then the maximum number of guard tags to be updated in response to the instruction may be 1. Hence it will be appreciated that some instruction opcodes could sometimes function as a multiple guard tag setting instruction and other times function as a single guard tag setting instruction, depending on the parameters specified by the instruction. In general the multiple guard tag setting instructions described above may be any instruction which is capable, for at least some values of its parameters, of triggering two or more consecutive blocks of memory locations to have their guard tags set to an updated value.

In addition to the multiple guard tag setting instructions or the type discussed above, the instruction set architecture supported by the instruction decoder and the processing circuitry may also include a single guard tag setting instruction, in response to which the instruction decoder controls the memory access circuitry to set the guard tag associated with a single block of memory locations to an updated value. For example, the single guard tag setting instruction may have a different opcode to the multiple guard tag setting instruction, and may be incapable of triggering the memory access circuitry to update more than one guard tag.

Figure 1:
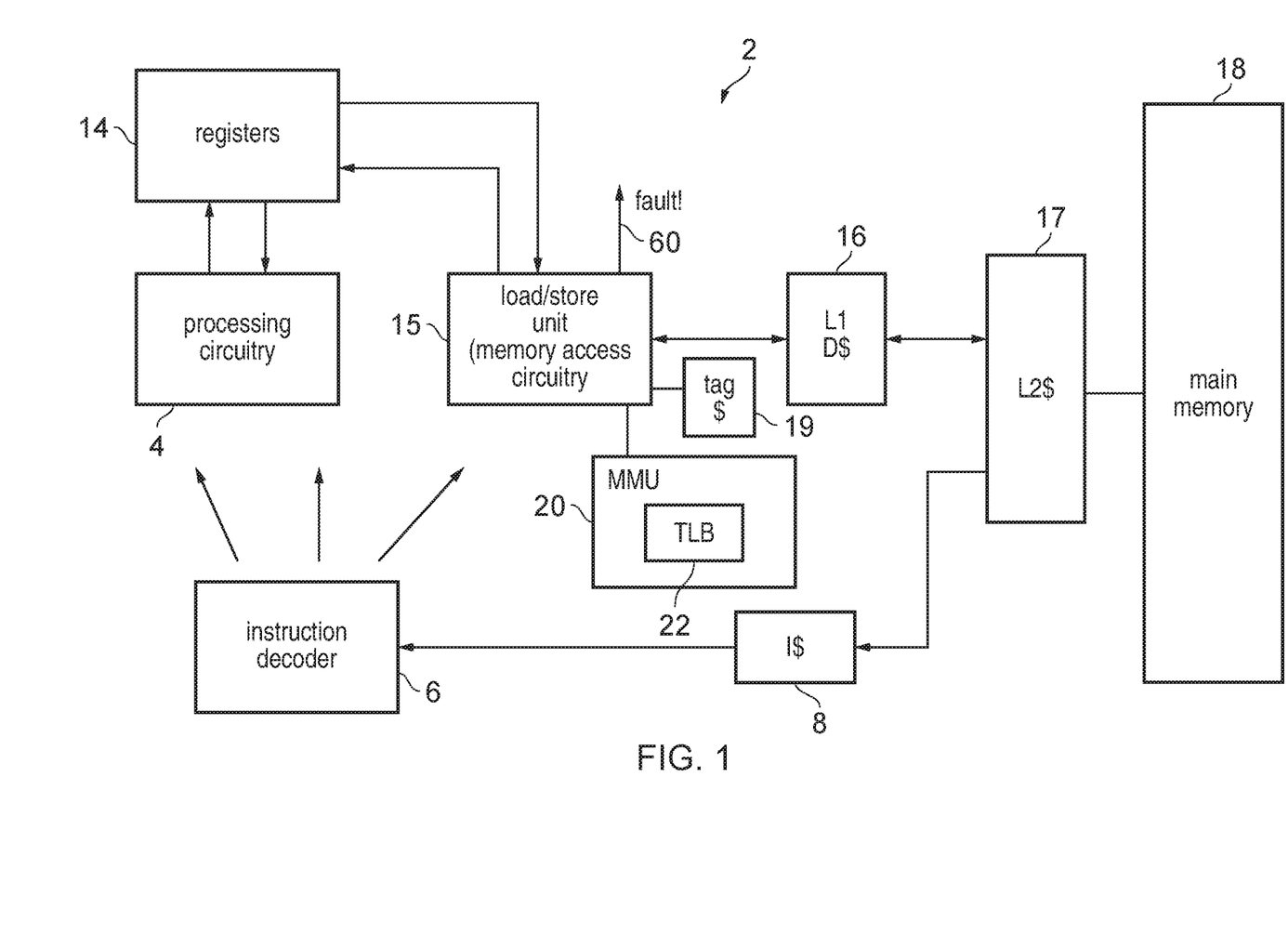
FIG. 1 schematically illustrates an example of a data processing apparatus.

FIG. 1 schematically illustrates an example of a data processing apparatus 2. It will be appreciated that this is simply a high level representation of a subset of components of the apparatus and the apparatus may include many other components not illustrated. The apparatus 2 comprises processing circuitry 4 for performing data processing in response to instructions decoded by an instruction decoder 6. The instruction decoder 6 decodes instructions fetched from an instruction cache 8 to generate control signals 10 for controlling the processing circuitry 4 to perform corresponding processing operations represented by the instructions. The processing circuitry 4 may include one or more execution units for performing operations on values stored in registers 14 to generate result values to be written back to the registers. For example the execution units could include an arithmetic/logic unit (ALU) for executing arithmetic operations, or logical operations, a floating-point unit for executing operations using floating-point operands and/or a vector processing unit for performing vector operations on operands including multiple independent data elements. The processing circuitry also includes a memory access unit (or load/store unit) 15 for controlling transfer of data between the registers 14 and the memory system. In this example, the memory system includes the instruction cache 8, a level 1 data cache 16, a level 2 cache 17 shared between data and instructions, and main memory 18. It will be appreciated that other cache hierarchies are also possible—this is just one example. A memory management unit (MMU) 20 is provided for providing address translation functionality to support memory accesses triggered by the load/store unit 15. The MMU has a translation lookaside buffer (TLB) 22 for caching a subset of entries from page table stored in the memory system 16, 17, 18. Each page table entry may provide an address translation mapping for a corresponding page of addresses and may also specify access control parameters, such as access permissions specifying whether the page is a read only region or is both readable and writable, or access permissions specifying which privilege levels can access the page.

Figure 2:
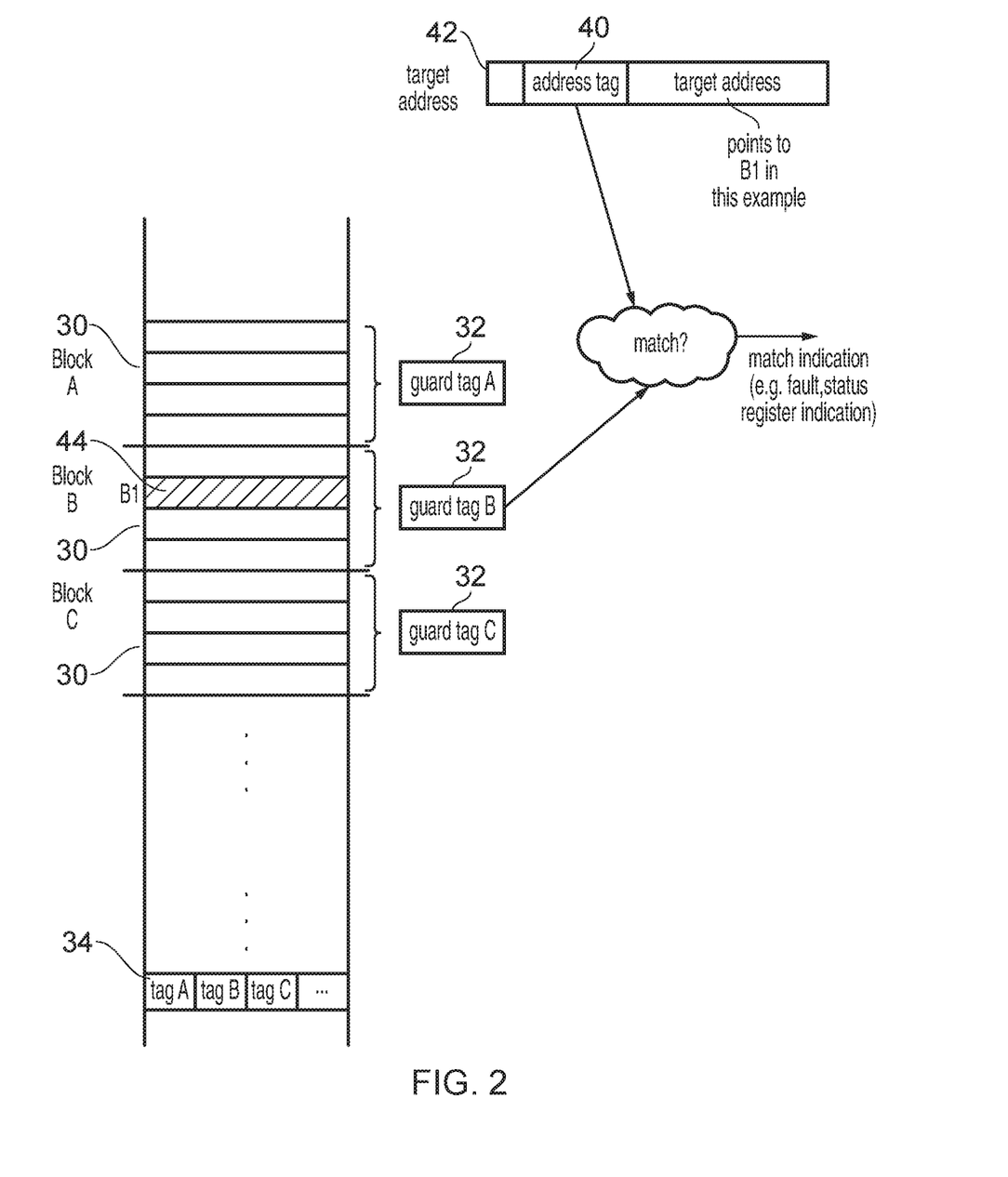
FIG. 2 shows an example of a tag-guarded memory access operation comprising checking whether an address tag matches a guard tag.

FIG. 2 schematically illustrates a concept of tag-guarded memory accesses. The physical address space used to refer to memory locations within the memory system may be logically partitioned into a number of blocks 30 each comprising a certain number of addressable locations. For conciseness, in the example of FIG. 2, each block 30 comprises four memory locations, but other block sizes could be used as well. Each block 30 is associated with a corresponding guard tag 32. The guard tags associated with a certain number of blocks 30 can be gathered together and stored either within a different architecturally accessible memory location 34 within the physical address space, or within additional storage locations provided in main memory 18 which are not architecturally accessible (not mapped to the same physical address space). The use of separate non-architecturally accessible storage may in some cases be preferred to avoid using up space in the data caches 16, 17 for caching guard tag values, which could impact on the performance of the regular code and could make coherency management more complex. An additional tag cache 19 could be provided in the micro architecture for caching tag values from the non-architecturally accessible storage, for faster access than if the tags had to be accessed from main memory 18. The particular mapping of which tag storage locations 34 correspond to each block 30 may be controlled by the load/store unit 15 and could be hardwired or could be programmable. While in FIG. 2 each tag 32 is associated with a block of physical addresses, it would also be possible to provide guard tags 32 associated with virtual memory locations in a virtual memory address space, but this may require some additional address translations on each memory access. Hence by associating the guard tag 32 with physical memory locations this can improve performance. In general it is a choice for the particular micro architectural implementation exactly how the guard tags 32 are associated with the corresponding blocks 30 of the physical address space. In general, all that is required is that the guard tag 32 associated with a given block of memory can be accessed and compared.

Hence, when a tag-guarded memory access is required, an address tag 40 (which is associated with the target address 42 identifying the addressed location 44 to be accessed), is compared against the guard tag 32 which is associated with the block of memory locations 30 which includes the addressed location 44. For example, in FIG. 2 the target address 42 points to a certain location B1 in memory, marked 44 in the address space of FIG. 2. Therefore the guard tag B which is associated with the block of locations B including location B1 is compared against the address tag 40 associated with a target address 42. As shown in the top of FIG. 2, the address tag 4 may be determined as a function of selected bits of the target address itself. In particular, the address tag may be determined from bits within a portion of the target address which is unused for indicating the specific memory location which is to be selected as the addressed location 44. For example, in some architectures the top portion of bits of the target address may always have a certain fixed value such as a sign extension (all 0s or all 1s) and so an address can be tagged with the address tag 40 by overwriting these unused bits with an arbitrary tag value. The particular address tag value can be selected by a programmer or compiler for example. The address tag and guard tag 32 can be a relatively small number of bits, e.g. 4 bits, and so need not occupy much space within the memory and within the target address. Providing 4 bits of tag space, i.e. 16 possible values of the tags, can often be enough to detect many common types of memory access errors.

Hence, when a tag-guarded memory access is performed, the load/store unit 15 compares the address tag 40 and the guard tag 32 associated with a block 30 including the addressed location 44, and determines whether they match. The load/store unit 15 generates a match indication indicating whether the address tag 40 and the guard tag 32 matched. For example, this match indication could be a fault signal 60 which is generated if there is a mismatch between the address tag 40 and the guard tag 32, or an indication placed in a status register indicating whether there was a match, or an entry added to an error report to indicate the address for which the error was detected and/or the instruction address of the instruction which triggered the error.

Figure 3:
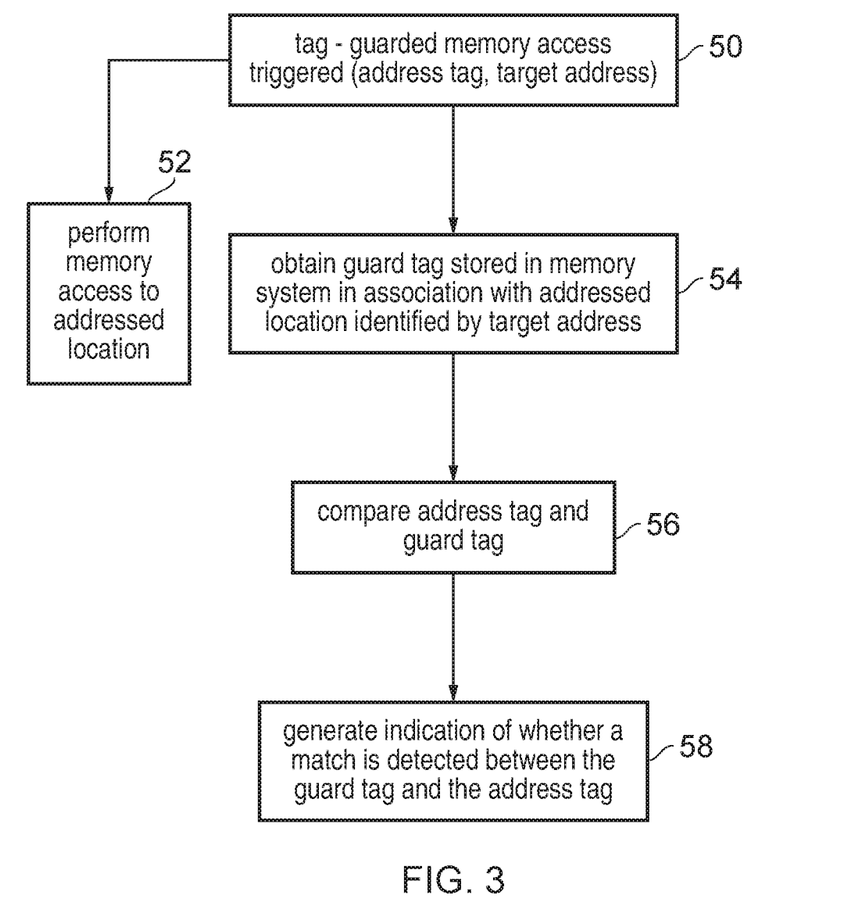
FIG. 3 is a flow diagram showing a method of performing a tag-guarded memory access operation.

FIG. 3 shows a flow diagram for handling a tag guarded memory access. The instruction triggering the memory access may specify an address tag and a target address. As shown in FIG. 2, in some cases the address tag may actually be derived from a subset of bits of the target address itself, although in other examples it could be specified in a separate register. At step 50, the instruction triggering the tag guarded memory access is encountered. In response, at step 52 the memory access circuitry 15 triggers a memory access to the addressed location 44 identified by the target address. Also, at step 54 the memory access circuitry 15 obtains the guard tag 32 which is stored in the memory system in association with the block of memory locations 30 that includes the addressed location 44 identified by the target address. At step 56 the memory access circuitry 15 compares the address tag 40 with the guard tag 32 obtained at step 54. At step 58 an indication of whether a match is detected between the guard tag and the address tag is generated by the memory access circuitry 15 (e.g. any of the types of match/mismatch reporting indication described above). The precise indication used to report any mismatch may vary from implementation to implementation.

Figure 4:
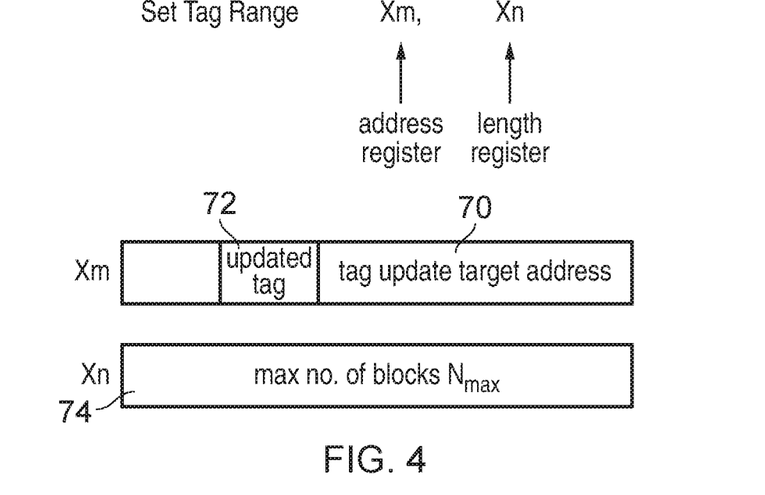
FIG. 4 shows a register-length-specifying variant of a multiple guard tag setting instruction.

FIG. 4 illustrates an example of a register-length-specifying variant of a multiple guard tag setting instruction. The instruction specifies as its parameters an address register Xm which specifies a tag update target address 70, which also includes an updated tag value 72 specified using a subset of bits of the address. The instruction also specifies a length register Xn which specifies a maximum number of blocks 74 $N_{max}$ to be updated in response to the instruction.

Figure 5:
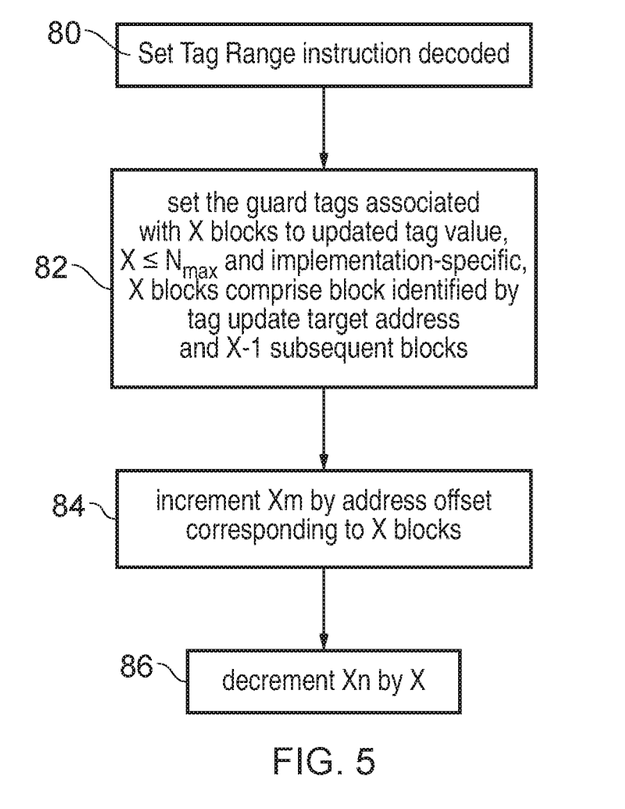
FIG. 5 is a flow diagram illustrating a method of processing the instruction of FIG. 4.

FIG. 5 is a flow diagram illustrating processing of the instruction of FIG. 4 by the apparatus 2 of FIG. 1. At step 80 the multiple guard tag setting instruction is decoded by the instruction decoder 6. In response, the instruction decoder 6 generates control signals for controlling the processing circuitry 4 and load/store unit 15 to perform the subsequent steps of FIG. 5. At step 82 the load/store unit 15 generates signals for requesting that the memory system performs at least one memory access for setting the guard tags associated with X blocks of memory locations to an updated tag value specified by the updated tag 72 derived from address register Xm. The number of blocks X to be updated may be any number less than or equal to $N_{max}$, the maximum number of blocks 74 specified in length register Xn. The particular value for X may be implementation-specific. That is, the instruction set architecture comprising the instruction of FIG. 4 does not specify what particular value of X needs to be selected. A given processor implementation is free to select any value for X that is convenient for that particular micro-architectural implementation. In cases where X is 2 or more, then the X blocks of memory 30 whose guard tags are updated comprise the block that is identified by the tag update target address 70 and X−1 subsequent blocks which follow on consecutively from the block identified by the tag update target address. In cases where X=1 then only the block identified by the tag update target address has its guard tag updated. If X=0, which could occur if the length register Xn specifies $N_{max}$=0, then no blocks of memory 30 have their corresponding guard tags 32 updated.

At step 84, the control signals generated by the instruction decoder 6 control the processing circuitry 4 to increment the tag update target address 70 specified in address register Xm by an address offset which corresponds to X blocks of memory. That is, the address offset may correspond to X times the size of one memory block 30, where the block size is dependent on a particular granularity with which guard tags 32 are allocated to memory locations (which may be selected as an implementation-dependent parameter). Hence, Xm′=Xm+X*(block size). In other examples, the address in register Xm could be decremented by X*(block size).

Figure 6:
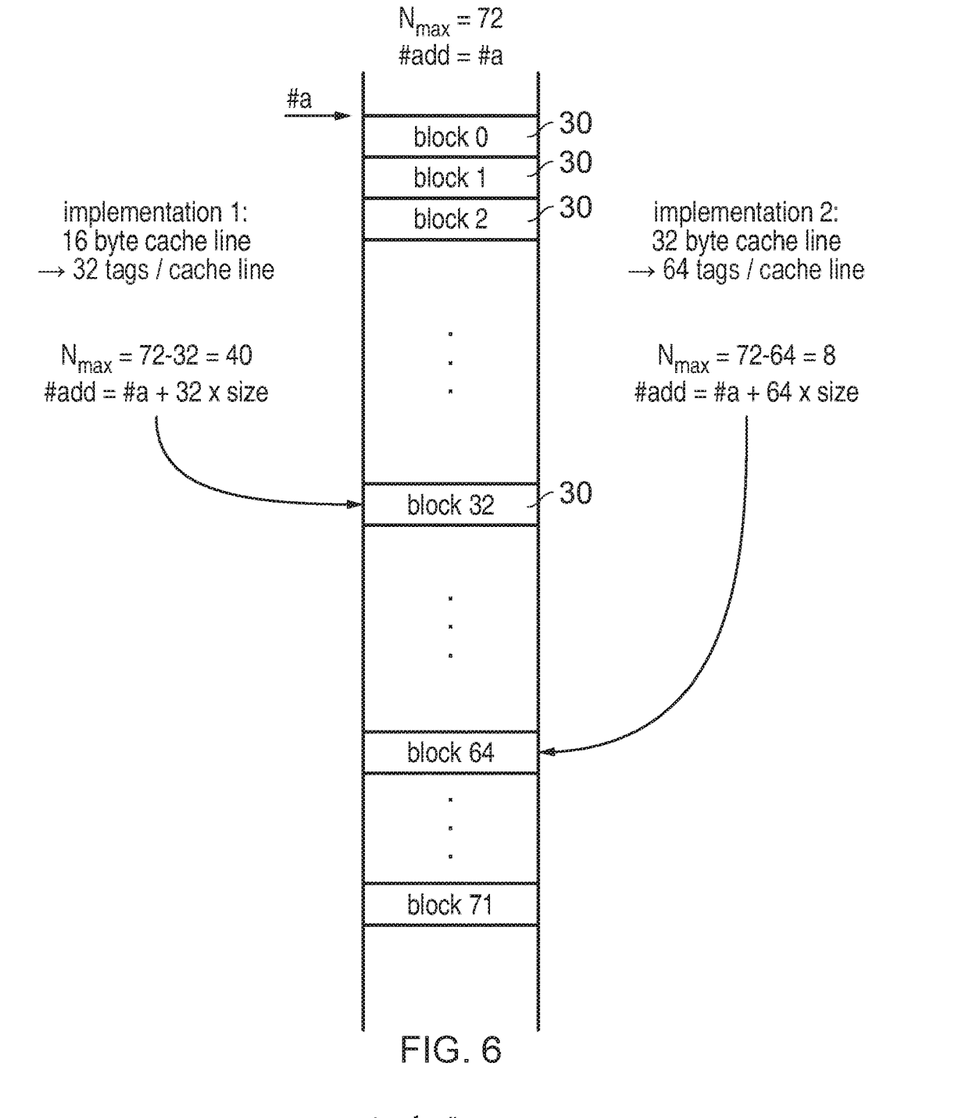
FIG. 6 illustrates an example of different micro-architectural implementations responding to the same multiple guard tag setting instruction to update different numbers of tags.

Also, at step 86 the control signals control the processing circuitry 4 to decrement the length register Xn by an amount proportional to X, the number of blocks for which the guard tags were updated in response to the instruction. In the example of FIG. 6, Xn′=Xn−X.

In other examples, the length register Xn could, instead of representing the actual maximum number of blocks for which the tags are to be updated, represent the length in terms of a number of some multiple of blocks, or in terms of the number of bytes of the size of the address range for which the guard tags are to be set, in which case Xn could be decremented by less than or greater than X. For example, if the base granularity at which tags can be updated is G, then the length register Xn could specify a length parameter $N_G$ indicating the number of multiples of G tags to be updated, i.e. $N_{max}=N_G*G$. In this case, at step 82 the micro-architecture implementation may be constrained to choose a value of X which is a multiple of G, and at step 86 the length parameter $N_G$ may be decremented by X/G instead of X. In another example, if the length parameter specifies a maximum value B indicating the maximum number of bytes of memory for which the corresponding guard tags are to be updated, and each guard tag is associated with a K-byte block of memory locations, then the address register may be incremented/decremented to Xm′=Xm±X, where X is a multiple of K less than or equal to B, and the length register Xn may be decremented to Xn'=Xn−(X*K). For example, if each tag is associated with 16 bytes of memory (K=16), and the micro-architecture chooses to update, say, 2 tags per instance of the instruction (X=2), then SetTagRange x1, [x2]! with length parameter x1=128 and start address x2=0x8000 could trigger the processing circuitry to set 2 tags and then decrement x1 to 128−2*16=96, and increment x2 to 0x8020.

FIG. 6 illustrates why this form of instruction can be particularly useful to allow software to use an implementation agnostic routine, regardless of the particular granularity of tag setting used for a given micro-architectural implementation. For example, a loop maybe defined in the executed code as follows:

X0=base address
X1=length
Loop:
SetTags [X0]!, X1
CBNZ X1, loop; compare X1 with zero and branch to 'loop' if not FIG. 6 shows an example where the base address is specified as address #a and the length to 72. One potential processor implementation of this architecture could use 16-byte cache lines, so in one implementation if each guard tag 32 comprises 4 bits then there is space for 32 tags to be stored in a single cache line. A cache line is the unit of memory which can be read/written in one request by the memory system. It can often be more efficient to carry out operations at the granularity of one cache line. Hence, in implementation 1, it may be preferred to update 32 tags in response to the multiple guard tag setting instruction of FIG. 4. In this case, executing the instruction on implementation 1 may result in 32 of the 72 blocks of the memory having their guard tag updated, so register X1 providing $N_{max}$ is reduced to 72−32=40, and the tag update target address in register X0 incremented to address #a+32*(block size) so that it now points to block 32. The next iteration of the loop will then set new tag values for the next 32 blocks of memory and so on until the final block 71 has its tag updated, and the conditional branch instruction CBNZ will then exit the loop because X1 has been decremented to zero.

In contrast, for a different micro-architectural implementation 2 using 32-byte cache lines, 64 tags can fit within one cache line and in this case it may be preferred to update more tags per instance of the tag setting instruction. In this case, one execution of the instruction may set 64 tags, i.e. the given number X shown in FIG. 5 is 64. In FIG. 6, $N_{max}$ is decremented to 72−64=8 on the first iteration of the loop, and the address updated to point to block 64 at address #a+64*(block size). The final 8 tags are set in the second iteration of the loop.

In other example implementations, guard tags may be stored in caches next to the data that they are guarding. For example, a cache line of a given size (e.g. 64 byte cache lines) may be extended with a certain number of guard tags each corresponding to a certain portion of the cache line. For example, if each tag corresponds to 16 bytes of the cache line then 4 4-bit tags could be associated with each cache line. In this case, such a micro-architecture may prefer to limit to setting 4 guard tags per instance of the tag setting instruction. Again, the loop above may still function on such a micro-architecture, but will require more iterations of the loop before all of the guard tags have been set, compared to the 2 implementations shown in FIG. 6

Hence, different implementations can set different numbers of tags per instruction, but nevertheless the same program loop can be executed regardless. While some implementations may require more iterations of the loop to set the required tags than other implementations, each implementation will eventually branch out of the loop once the value in the length register Xm has been reduced to zero.

Figure 7:
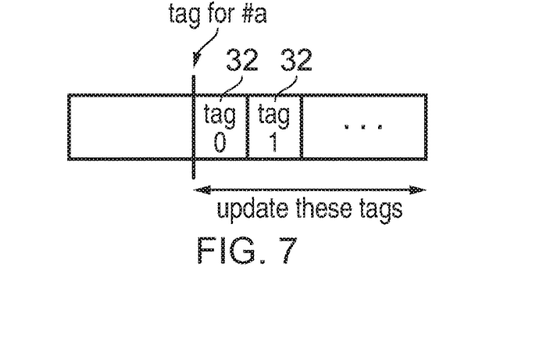
FIG. 7 shows an example of a micro-architecture having the flexibility to vary how many tags are updated based on cache line alignment.

FIG. 7 illustrates another reason why it may be useful to give a micro-architectural implementation flexibility to update different numbers of tags. Depending on alignment of a supplied address #a, the tags to be updated may start part way through a cache line. In this case, it may be preferred for the instruction to only update the tags in the remainder of the cache line so that the next iteration of the loop can start updating tags aligned to a cache line boundary, making subsequent accesses more efficient. In contrast, an implementation which always updates the same number of tags in response to the instruction could not use such micro architectural optimisations.

Figure 8:
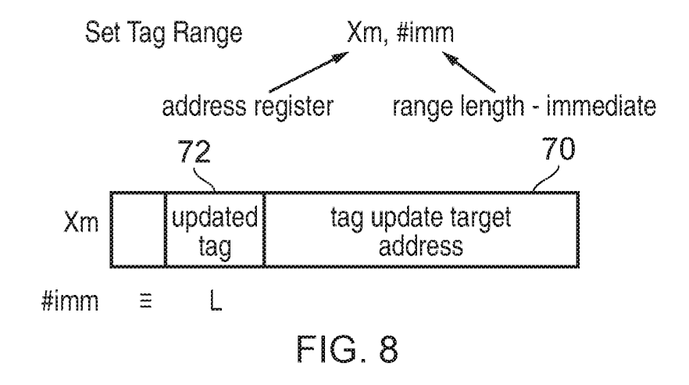
FIG. 8 illustrates an immediate-length-specifying variant of the multiple guard tag setting instruction.

FIG. 8 shows an alternative form of multiple guard tag setting instructions which uses an immediate value #imm to specify the length of the range of memory for which guard tags are to be set to an updated tag value 72. The target update tag target address 70 and updated tag value 72 may still be specified in an address register Xm the same as in FIG. 4, but this time the immediate value #imm specified in the instruction encoding specifies an absolute length indication L which indicates the precise number of blocks for which the tags values are to be updated.

Figure 9:
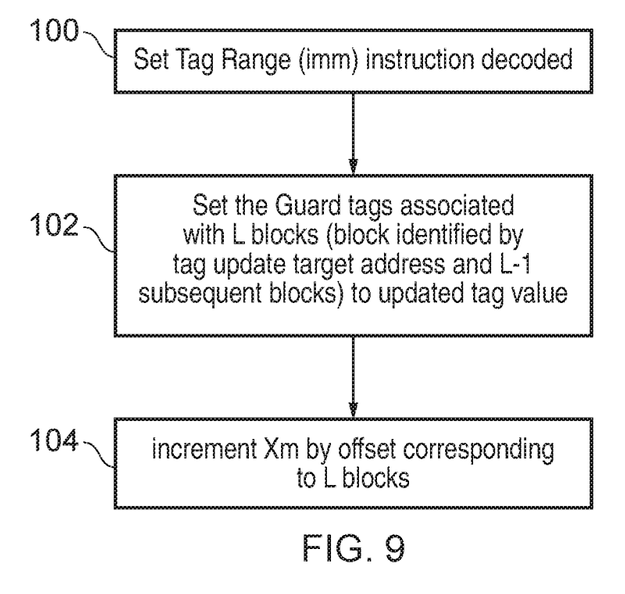
FIG. 9 is a flow diagram illustrating a method of processing the instruction of FIG. 6.

FIG. 9 illustrates a flow diagram showing a method of controlling processing of this type of instruction shown in FIG. 8. At step 100 the instruction decoder 6 decodes the immediate-length-specifying variant of the guard tag setting instruction shown in FIG. 8. In response the instruction decoder generates control signals for controlling the memory access circuitry 15 at step 102 to set the guard tags that are associated with L blocks of memory locations to the updated tag value 72. Again, when L is equal to 2 or more then the L blocks comprise the block identified by the tag update target address 70 and L−1 subsequent blocks will follow on consecutively from the block identified by the tag update target address. If L=1 then only the tag associated with the block identified by the tag update target address is updated. If L=0 then no guard tags are updated. At step 104 the control signals generated by the instruction decoder 6 also control the processing circuitry 4 to update the address register Xm to increment the address by an offset corresponding to L blocks, i.e. Xm'=Xm+L*(block size).

Figure 10:
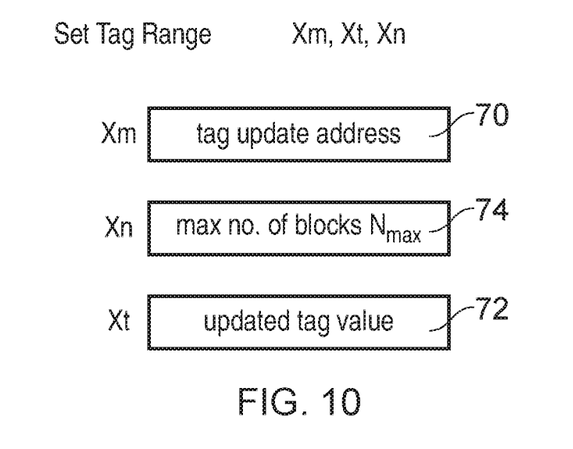
FIG. 10 illustrates an alternative variant of the instruction of FIG. 4 in which the updated tag value is specified using a separate register to the tag updated address.

FIG. 10 shows a variation of the instruction shown in FIG. 4, in which the updated tag value 72 is specified in a third register Xt separate from the tag update address 70 which is specified in the address register Xm. Otherwise the behaviour of this instruction is exactly the same as shown in FIGS. 4 and 5. It will be appreciated that a similar variant of the immediate-specifying instruction shown in FIG. 8 could be provided, with the update tag value 72 specified independently from the tag update address 70.

Figure 11:
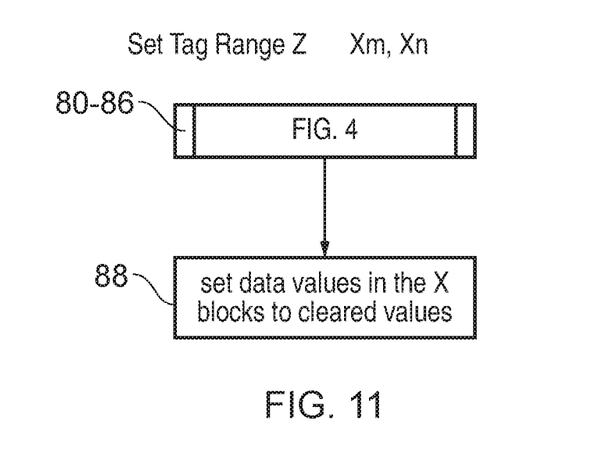
FIG. 11 illustrates a data-clearing variant of the multiple guard tag setting instruction.

FIG. 11 shows a data-clearing variant of the instruction of FIG. 4. The address register Xm and length register Xn specify the same parameters as shown in FIG. 4. In response to this instruction, steps 80-86 are preformed in the same way as shown in FIG. 5. However, in response to the data clearing variant of the instruction an additional step 88 is performed. At step 88, the instruction decoder 6 controls the memory access circuitry 15 to generate additional memory accesses for setting the data values in the X blocks of memory to cleared values uncorrelated with the previous values of those data values (e.g. to a predetermined value, such as 0, or to a random value). This avoids the need for a separate instruction for clearing the data values in addition to the tag setting instruction, enabling a tighter loop and smaller code density. While FIG. 11 shows an example of a data clearing variant applied to the form of instruction shown in FIG. 4, similar data clearing variants could also be implemented for any of the other types of multiple tag setting instructions described above.

Figure 12:
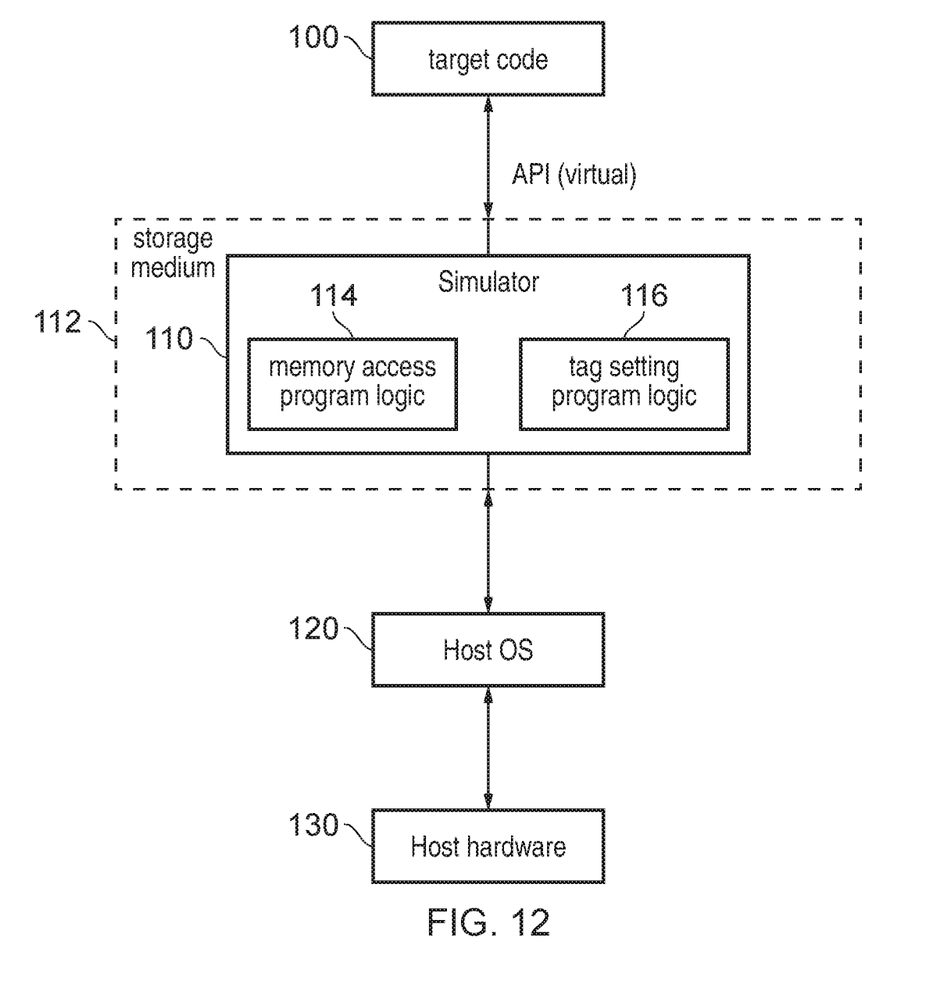
FIG. 12 shows an example of a simulator supporting the multiple guard tag setting instruction.

FIG. 12 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 130, optionally running a host operating system 120, supporting the simulator program 110. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 130), some simulated embodiments may make use of the host hardware, where suitable.

The simulator program 110 may be stored on a computer-readable storage medium 112 (which may be a non-transitory medium), and provides a program interface (instruction execution environment) to the target code 100 (which may include applications, operating systems and a hypervisor) which is the same as the application program interface of the hardware architecture being modelled by the simulator program 110. Thus, the program instructions of the target code 100, including the multiple guard tag setting instruction described above, may be executed from within the instruction execution environment using the simulator program 110, so that a host computer 130 which does not actually have the hardware features of the apparatus 2 discussed above can emulate these features. For example, the simulator program 110 may include memory access program logic 114 for controlling access to memory by instructions of the target code 100. For example, the memory access program logic 114 may include instructions for performing the comparison of the guard tag and the address tag and reporting whether any mismatch between the guard tag and address tag has been detected. Also, the simulator program 110 may include tag setting program logic 116, which comprises instructions for triggering, in response to a multiple guard tag setting instruction included in the target code 100, one or more memory accesses for setting the guard tags in a corresponding way to the way in which the hardware embodiment would set the tags. In the simulator approach, the number of tags X set in response to the register-length-specifying variant of the multiple guard tag setting instruction may be selected by the simulator program 110.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
   memory access circuitry to perform a tag-guarded memory access operation in response to a target address, the tag-guarded memory access operation comprising:
      comparing an address tag associated with the target address with a guard tag stored in a memory system in association with a block of one or more memory locations comprising an addressed location identified by the target address; and
      generating an indication of whether a match is detected between the guard tag and the address tag; and
   an instruction decoder to decode a multiple guard tag setting instruction to control the memory access circuitry to trigger at least one memory access to update the guard tags associated with at least two consecutive blocks of one or more memory locations.

2. The apparatus according to claim 1, in which the tag-guarded memory access operation comprises controlling whether a memory access to the addressed location is allowed depending on whether a match is detected between the guard tag and the address tag.

3. The apparatus according to claim 1, in which the tag-guarded memory access operation comprises performing a memory access to the addressed location irrespective of whether a match is detected between the guard tag and the address tag.

4. The apparatus according to claim 1, in which the tag-guarded memory access operation comprises signalling a fault condition when a mismatch is detected between the guard tag and the address tag.

5. The apparatus according to claim 1, in which, in the tag-guarded memory operation, the memory access circuitry is configured to determine the address tag as a function of one or more selected bits of the target address.

6. The apparatus of claim 1, in which, in the tag-guarded memory access operation, the memory access circuitry is configured to select the addressed location independent of the address tag.

7. The apparatus according to claim 1, in which:
in response to a register-length-specifying variant of the multiple guard tag setting instruction identifying a length register, the instruction decoder is configured to control:
the memory access circuitry to update the guard tags associated with a given number of consecutive blocks less than or equal to a maximum number of blocks identified by a length parameter stored in the length register; and
processing circuitry to decrement the length parameter stored in the length register by an amount proportional to the given number.

8. The apparatus according to claim 1, in which in response to an immediate-length-specifying variant of the multiple guard tag setting instruction identifying an immediate parameter, the instruction decoder is configured to control the memory access circuitry to update the guard tags associated with a number of consecutive blocks specified by the immediate parameter.

9. The apparatus according to claim 1, in which the multiple guard tag setting instruction specifies a tag update target address for identifying the at least two consecutive blocks.

10. The apparatus according to claim 9, in which the at least two consecutive blocks comprise the block comprising a memory location identified by the tag update target address and at least one subsequent block of one or more memory locations.

11. The apparatus of according to claim 9, in which:
the multiple guard tag setting instruction specifies an address register for storing an address determining value for determining a tag update target address for identifying the at least two consecutive blocks; and
in response to the multiple guard tag setting instruction, the instruction decoder is configured to control processing circuitry to increment or decrement the address determining value stored in the address register by an offset corresponding to the number of blocks of memory locations for which the guard tags are updated in response to the multiple guard tag setting instruction.

12. The apparatus according to claim 9, in which in response to the multiple guard tag setting instruction, the instruction decoder is configured to control the memory access circuitry to trigger memory accesses to update the guard tags associated with the at least two consecutive blocks to an updated tag value determined as a function of one or more selected bits of the tag update target address.

13. The apparatus according to claim 7, in which in response to the multiple guard tag setting instruction, the instruction decoder is configured to control the memory access circuitry to trigger memory accesses to update the guard tags associated with the at least two consecutive blocks to an updated tag value determined as a function of a value stored in a tag value register specified by the multiple guard tag setting instruction independent from the tag update target address.

14. The apparatus of claim 1, in which in response to a data-clearing variant of the multiple guard tag setting instruction, the instruction decoder is configured to control the memory access circuitry to trigger memory accesses for setting the data values stored in the at least two consecutive blocks of one or more memory locations to cleared values uncorrelated with previous contents of the at least two consecutive blocks.

15. The apparatus of claim 14, in which each cleared value comprises one of:
a predetermined value;
zero; and
a random value.

16. A method comprising:
performing a tag-guarded memory access operation in response to a target address, the tag-guarded memory access operation comprising:
comparing an address tag associated with the target address with a guard tag stored in a memory system in association with a block of one or more memory locations comprising an addressed location identified by the target address; and
generating an indication of whether a match is detected between the guard tag and the address tag; and
in response to decoding of a multiple guard tag setting instruction, triggering at least one memory access to update the guard tags associated with at least two consecutive blocks of one or more memory locations.

17. A non-transitory storage medium storing a computer program for controlling a host data processing apparatus to provide an instruction execution environment for execution of instructions of target program code, comprising:
memory access program logic to perform a tag-guarded memory access operation in response to a target address, the tag-guarded memory access operation comprising:
comparing an address tag associated with the target address with a guard tag stored in a memory system in association with a block of one or more memory locations comprising an addressed location identified by the target address; and
generating an indication of whether a match is detected between the guard tag and the address tag; and
tag setting program logic responsive to a multiple guard tag setting instruction of the target program code to trigger at least one memory access to update the guard tags associated with at least two consecutive blocks of one or more memory locations.

* * * * *